(12) United States Patent
Berdan

(10) Patent No.: US 6,386,852 B1
(45) Date of Patent: May 14, 2002

(54) GAS ASSIST NEEDLE IN A MOLDING MACHINE

(75) Inventor: Karl R. Berdan, Midland (CA)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/507,853

(22) Filed: Feb. 22, 2000

(51) Int. Cl.$^7$ ............................................. B29C 49/60
(52) U.S. Cl. ........................ 425/130; 264/572; 425/812
(58) Field of Search ................................ 425/130, 812; 264/572

(56) References Cited

U.S. PATENT DOCUMENTS

| | | | |
|---|---|---|---|
| 5,127,814 A | * 7/1992 | Johnson et al. ............ 425/130 |
| 5,162,230 A | * 11/1992 | Ziegler et al. ............. 425/533 |
| 5,164,200 A | 11/1992 | Johnson |
| 5,186,884 A | 2/1993 | Hendry |
| 5,282,730 A | * 2/1994 | Daniels et al. ............. 425/130 |
| 5,302,337 A | 4/1994 | Krajewski |
| 5,364,252 A | 11/1994 | Hlavaty et al. |
| 5,423,667 A | 6/1995 | Jaroschek |
| 5,484,278 A | 1/1996 | Berdan |
| 5,511,967 A | 4/1996 | Berdan |
| 5,626,815 A | 5/1997 | Kaneishi et al. |
| 5,637,328 A | 6/1997 | Shah et al. |
| 5,750,155 A | 5/1998 | Eckardt et al. |
| 5,759,459 A | 6/1998 | Eckardt et al. |
| 5,762,861 A | 6/1998 | Gosdin |
| 5,770,237 A | 6/1998 | Sayer et al. |
| 5,776,412 A | 7/1998 | Eckardt et al. |
| 5,785,247 A | 7/1998 | Chen et al. |
| 5,798,080 A | 8/1998 | Ogura et al. |
| 5,837,186 A | 11/1998 | Gotterbauer |
| 5,869,105 A | 2/1999 | Murphy et al. |
| 5,895,667 A | 4/1999 | Eckardt et al. |
| 5,908,641 A | 6/1999 | Erikson |
| 5,928,600 A | 7/1999 | Chu |
| 5,928,677 A | 7/1999 | Gosdin |
| 5,939,103 A | 8/1999 | Erikson |
| 5,948,445 A | 9/1999 | Filipp |

* cited by examiner

Primary Examiner—Nam Nguyen
Assistant Examiner—Emmanuel Luk
(74) Attorney, Agent, or Firm—Harness, Dickey & Pierce, P.L.C.

(57) ABSTRACT

An injection needle for use in a mold cavity of a gas-assisted injection molding machine. The injection needle includes a tubular member and a stem slidably disposed in the tubular member. The stem is positionable in a raised position and a retracted position. The injection needle further includes a central bore extending within the stem for supplying a gas and a slot. The slot is operable for relieving gas pressure within the mold cavity when the stem is in the retracted position.

16 Claims, 3 Drawing Sheets

GAS ASSIST NEEDLE IN A MOLDING MACHINE

FIELD OF THE INVENTION

The present invention relates to gas-assisted injection molding machines and, more particularly, to injection needles for use with gas-assisted injection molding machines.

BACKGROUND AND SUMMARY OF THE INVENTION

Gas-assisted injection molding is commonly used to produce hollow articles having improved structural integrity and significant weight and material reduction. According to this technique, molten molding material, such as thermoplastic or rubber, is injected within a mold cavity in a manner conventional in the art. A gas, such as nitrogen, is then injected into the mold cavity through one or more injection needles typically positioned near the molding gate area or near a thick section of the article to be molded. As the gas is injected into the article to be molded within the mold cavity, a portion of the molten molding material within the mold cavity is forced or expelled out through a vent valve. Consequently, a wall of molding material remains around the periphery of the mold cavity, thereby forming a hollow molded article having improved structural integrity and significant weight and material reduction.

Typically, injection molding machines include a core and a cavity plate mounted on a base plate or clamping plate. The core and cavity plate are separable along a common plane. The mold cavity is formed on the common plane to facilitate the removal of the molded article when the mold is opened. To further facilitate the removal of the molded article, an ejector mechanism is commonly employed. The ejector mechanism includes pins movable normal to the common plane used to elevate the molded article relative to the mold cavity when the mold is opened.

As described above, gas is typically injected into the mold cavity by at least one injection needle. Each injection needle is typically slidably disposed in the core and is spring biased into a retracted position. Upon introduction of the gas, the injection needle is raised via gas pressure into the mold cavity against the force of the spring, thereby supplying gas to the mold cavity. A complete description of a gas injector mechanism and an ejector mechanism may be found in U.S. Pat. No. 5,511,967 entitled "Self-Contained Gas Injector" ("'967 Patent"), which is incorporated herein by reference.

Briefly, the '967 Patent describes, among other things, a pair of inclined slots that direct jets of gas from a pair of flats radially into a mold cavity. When the head is in a retracted position, the head seals the pair of flats, thereby preventing the return flow of gas down the needle. A return gas flow may be preferred in situations where an increased return gas flow rate is needed or in situations where a separate gas vent valve will not or can not be used. Moreover, the pair of flats formed on the needle may not afford maximum structural integrity of the needle since significant lateral movement of the needle may occur.

Additionally, in operation, the valve member of the '967 Patent may clog when forming articles using a highly viscous or a rubber-like molding material. As should be appreciated to those skilled in the art, injection of molding material is typically accomplished at a pressure of approximately 20,000 psi. This extreme pressure has a two fold effect on the '967 injection needle—first, the blowing force of the material against the '967 injection needle forces the stem to be pushed to the side due to the pair of flats on opposing sides of the stem, which cause increased wear in the needle and reduces its operational life. Second, the molding material may be forced into the injection needle through any gaps, such as the pair of flats and/or wear gaps formed by the stem being forced to the side. When the material is forced into the injection needle, the '967 needle is unable to clear the material and becomes clogged.

Accordingly, there exists a need in the relevant art to provide a gas-assisted injection molding needle having vent slots to enable the return flow of gas from the mold cavity through the needle to the atmosphere or into a storage chamber, which is simultaneously capable of substantially eliminating any clogging effect. Moreover, there exists a need in the relevant art to provided a gas-assisted injection molding needle that is capable of maximizing the structural integrity of the needle and minimizing the wear thereof.

In accordance with the broad teachings of this invention, an injection needle for use in a mold cavity of a gas-assisted injection molding machine having an advantageous construction is provided.

In one aspect of the present invention, the injection needle includes a tubular member and a stem slidably disposed in the tubular member. In another aspect of the present invention, the stem is positionable in a raised position and a retracted position. A further aspect of the present invention provides an injection needle that includes a central bore extending within the stem for supplying a gas. An aperture is disposed in the stem and is in fluid communication with the central bore. The aperture is operable for supplying the gas into the mold cavity when the stem is in the raised position. Yet another aspect of the present invention employs a vent slot disposed in the stem and is in fluid communication with the central bore. The vent slot is operable for relieving gas pressure within the mold cavity when the stem is in the retracted position.

The injection needle of the present invention is advantageous over traditional constructions since the present invention enables the return flow of gas from the mold cavity through the vent slot to facilitate equalization of the gas pressure in the mold cavity relative to ambient condition. Furthermore, the vent slot of the injection needle is sized to minimize or substantially eliminate backflow of molten molding material through the injection needle to minimize or substantially eliminate any clogging effect. Still further, the outlet aperture is tapered to enable gas pressure to self clean the aperture and vent slot by forcing any clogging obstruction out of the needle. The injection needle of the present invention further maximizes the structural integrity of the injection needle to provide an improved useful life. Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
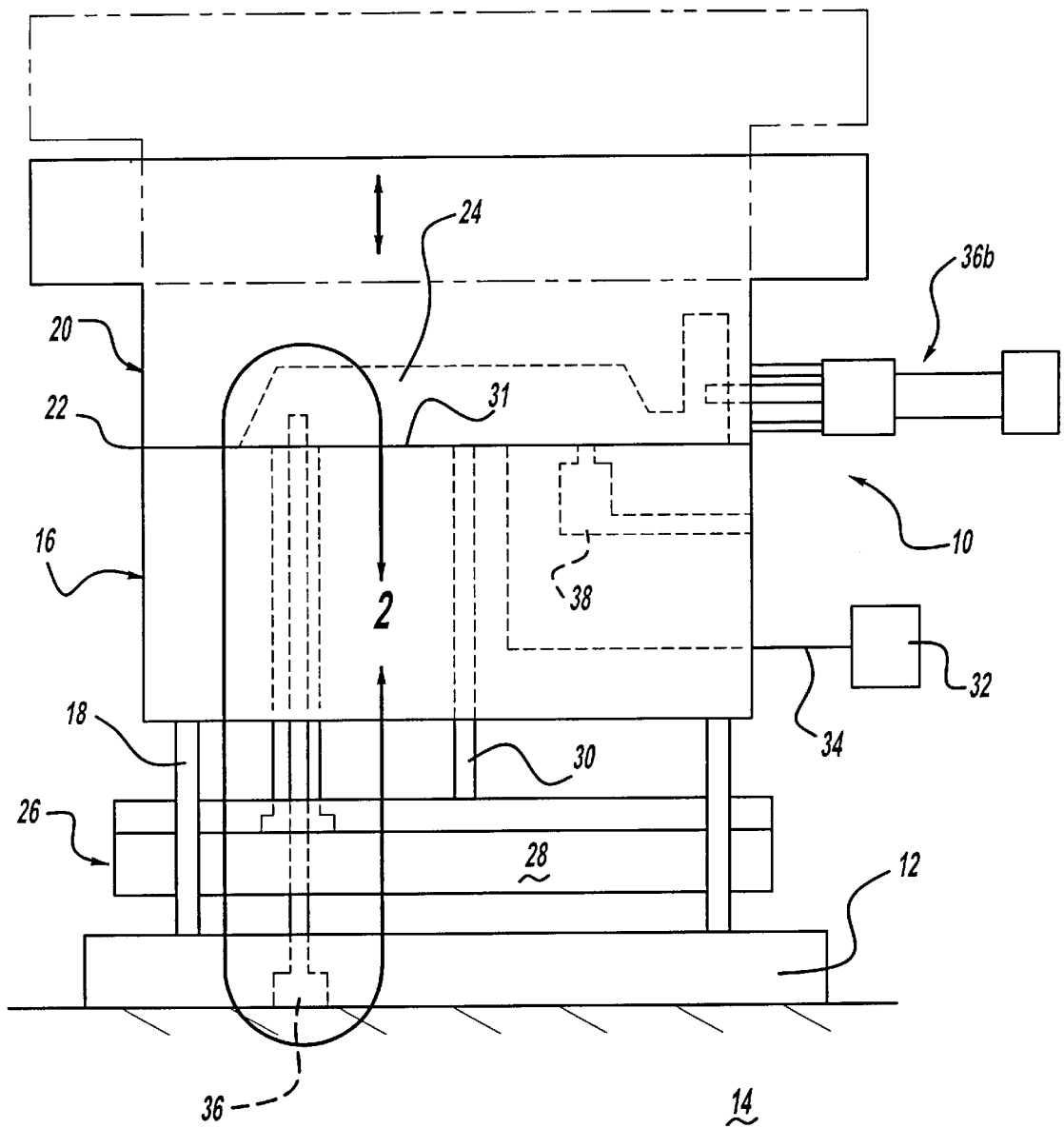
FIG. 1 is a schematic representation showing an injection molding machine employing a first preferred embodiment of a gas-assisted nozzle of the present invention.

Referring to FIG. 1, a first preferred embodiment of a gas-assisted injection molding machine 10 is shown having a base plate 12 secured to a mounting structure 14. A core 16 is supported on base plate 12 by support structure 18 so as to be spaced from, but fixed relative to, base plate 12. A cavity plate 20 is mounted on core 16 and movable relative thereto between a closed position, as shown in solid lines, and an open position, shown in chain dot lines in FIG. 1. Core 16 and cavity plate 20 abut along a common plane 22 in the closed position.

A mold cavity 24 is formed between core 16 and cavity plate 20 to define an exterior surface of an article to be molded. Typically, core 16 will have a substantially planar surface defining the back of the article to be molded with contoured surfaces being formed in cavity plate 20. More complicated shapes may, of course, be formed by having contoured surfaces formed in both core 16 and cavity plate 20.

An ejector mechanism 26 is located between cavity plate 20 and core 16. Ejector mechanism 26 includes an ejector plate assembly 28 slidably mounted on support structure 18 for movement relative to core 16. A plurality of ejector pins 30 (only one shown) are secured to ejector plate assembly 28 and extend through core 16. In a retracted position, each of the plurality of ejector pins 30 terminate at surface 31 of mold cavity 24 and, thus, do not interface with the contour of mold cavity 24. In an extended position, each of the plurality of ejector pins 30 extending above surface 31 to elevate the molded article relative to mold cavity 24 when cavity plate 20 is in the open position.

Gas assisted injection molding machine 10 further includes a molding material introduction device 32 for introducing molten molding material, such as polymers, elastomeric polymers, resins, or thermoplastics, through a supply line 34 and into mold cavity 24.

A gas injection valve assembly 36 is positioned in core 16 to supply pressurized gas, such as nitrogen, to the interior of mold cavity 24. This supply of pressurized gas into mold cavity 24 will expel molten molding material from mold cavity 24 through a vent valve 38 and thereby permit a hollow article to be molded. It should be appreciated that multiple voids may be formed in the article by providing a plurality of gas injection valve assemblies 36 (as indicated at 36b). A detailed description of gas injection valve assembly 38 may be found in U.S. Pat. No. 5,511,967 entitled "Self-Contained Gas Injector," which is hereby incorporated by reference.

Figure 2:
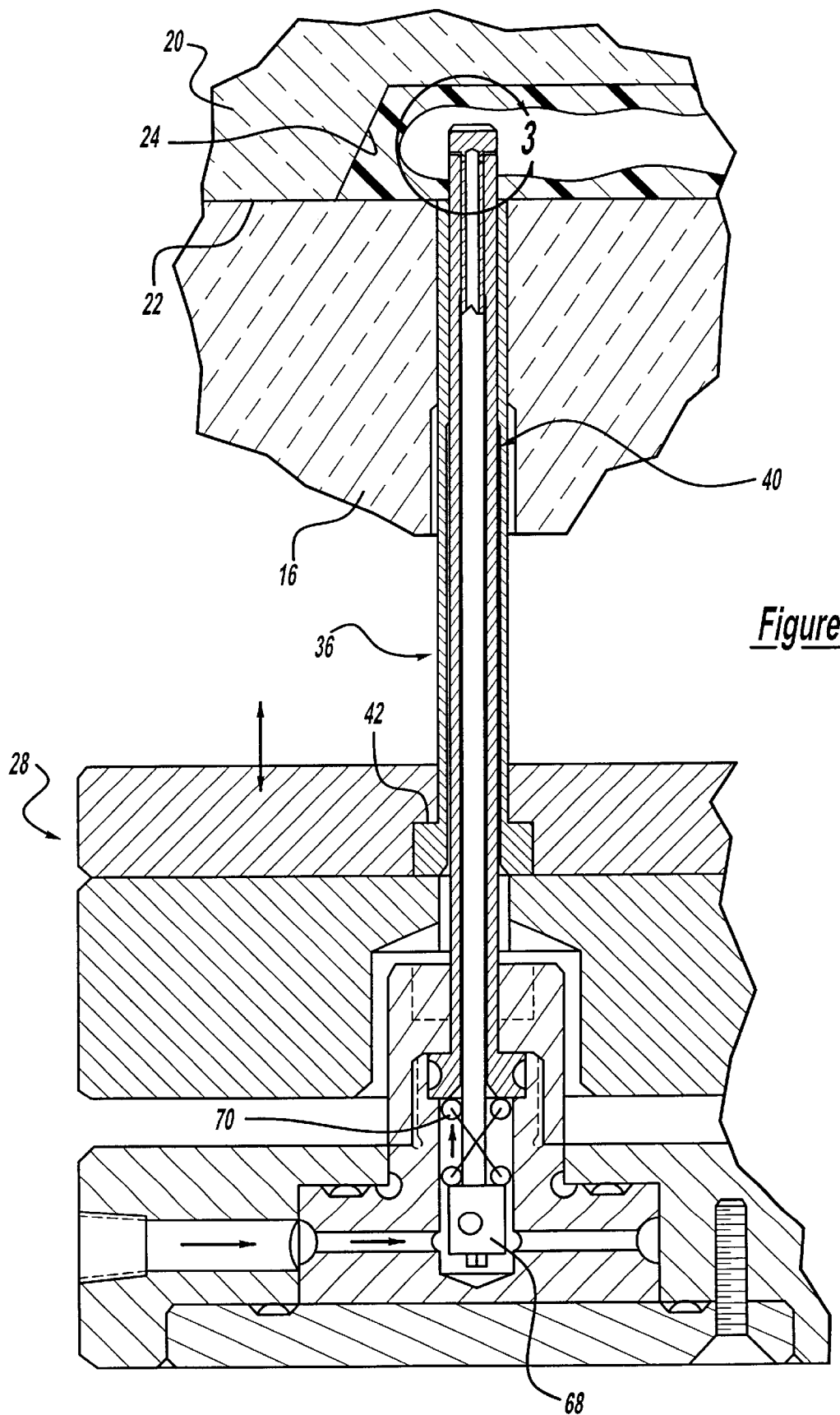
FIG. 2 is an enlarged cross-sectional view, taken within circle 2—2 of FIG. 1, showing the first preferred embodiment of the gas-assisted nozzle of the present invention.
Figure 3:
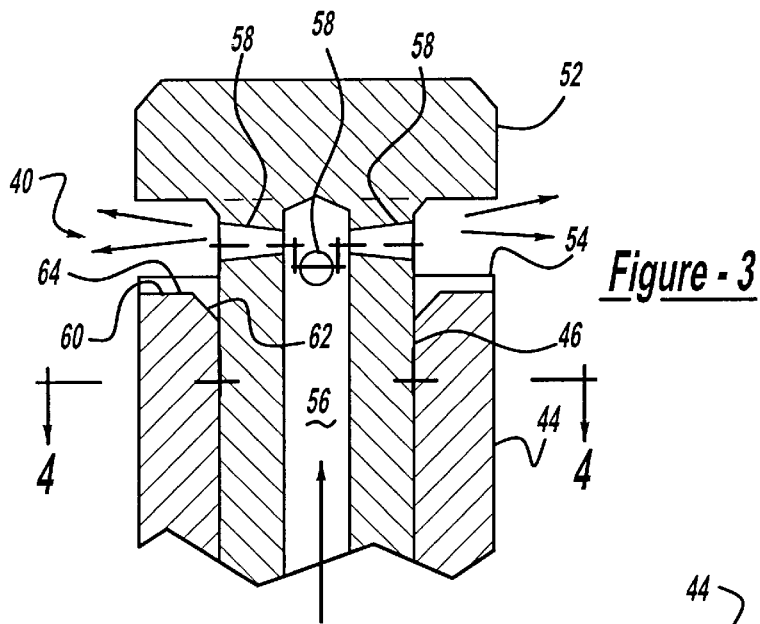
FIG. 3 is an enlarged cross-sectional view, taken within circle 3—3 of FIG. 2, showing the first preferred embodiment of the gas-assisted nozzle of the present invention.
Figure 4:
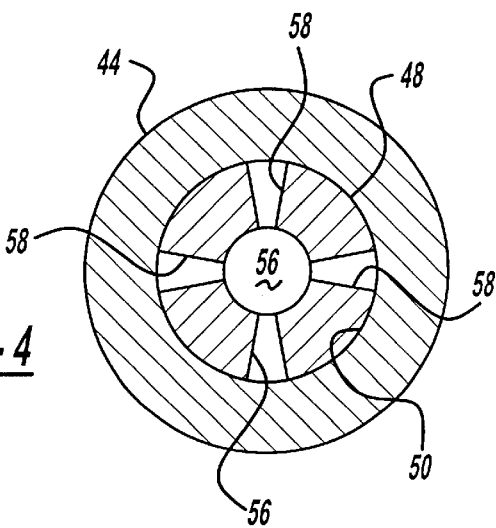
FIG. 4 is a cross-sectional view, taken along line 4—4 of FIG. 3, showing the first preferred embodiment of the gas-assisted nozzle of the present invention.

As seen in FIG. 2, an elongated gas injection needle 40 is provided that extends through ejector plate assembly 28 and core 16 to project into mold cavity 24. Injection needle 40 is slidably mounted within an enlarged flange 42. As best seen in FIGS. 3 and 4, injection needle 40 includes a hollow casing 44 and a stem 46. Stem 46 is slidably disposed in hollow casing 44 such that an outer surface 48 of stem 46 closely conforms in dimension to an inner surface 50 of hollow casing 44. This arrangement minimizes lateral movement of stem 46 relative to outer casing 44 and further provides a smooth sliding relationship between stem 46 and hollow casing 44. Preferably, hollow casing 44 and stem 46 are hardened and nitrated to prevent excessive wear and prolong their operational life.

Stem 46 further includes an enlarged head portion 52. Enlarged head 52 extends radially over an end face 54 of hollow casing 44. Stem 46 still further includes a central bore 56 and a plurality of apertures 58. Central bore 56 is disposed generally along the axis of stem 46 and is truncated at some point adjacent to enlarged head 52. The position of central bore 56 along the axis of stem 46 enables the structural integrity of stem 46 to be greatly improved. That is, by designing stem 46 to have a substantially tubular cross-section, the structural advantages of cylindrical shapes improves and prolongs the operational life of the injection needle 40.

The plurality of apertures 58 are radially disposed in stem 46 in fluid communication with central bore 56. Each of the plurality of apertures defines a fluid path between central bore 56 and mold cavity 24 so as to supply a pressurized gas, such as nitrogen, from a gas supply source (not shown) to the interior of mold cavity 24. It should be appreciated that a single aperture may be used depending upon the gas injection flow rate required.

As best seen in FIG. 3, each of the plurality of apertures 58 is radially disposed in stem 46 in a position substantially offset relative to an adjacent aperture along the longitudinal axis of stem 46. This offset relationship between each of the adjacent apertures maintains the structural integrity of stem 46. It should be appreciated that disposing each of the plurality of apertures at the same longitudinal position along stem 46 may result in a weakening of the structural integrity at that location.

Still referring to FIG. 3, the cross-section of each of the plurality of apertures 58 is substantially conical in shape. This conical shape enables injection needle 40 to self clean any obstruction within aperture 58. That is, during the injection of molding material, if molten molding material is forced into aperture 58, this material is easily expelled from the tapered surface of aperture 58 by the gas pressure developed during the injection of the gas. The ability to self clean any obstruction enables production to continue without requiring the mold to be opened and the injection needle to be cleaned. This conical shape may also minimize the gas impact pressure on adjacent sidewalls of mold cavity 24 during the introduction of the pressurized gas. The use of the conical apertures enables the gas stream to disperse and, thus, have less impact pressure on mold cavity walls near injection needle 40, thereby minimizing any disturbance to molten molding material around the periphery of mold cavity 24.

Injection needle 40 further includes a plurality of vent slots radially disposed about stem 46. Each of the plurality of vent slots is substantially aligned with an associated aperture 58 to permit the backflow of pressurized gas from mold cavity 24 through vent slot 60 and aperture 58 and into central bore 56 when stem 46 is in a retracted position. Each of the plurality of vent slots 60 includes a chamfered portion 62 and an entrance portion 64. Entrance portion 64 is sized such that when stem 46 is in a substantially retracted position relative to hollow casing 44, pressurized gas within mold cavity 24 may flow through entrance portion 64, chamfered portion 62, and central bore 56 without the backflow of molten molding material. Specifically, a smaller entrance portion 64 may eliminate, minimize, or at least deter the backflow of a highly viscous molding material while still allowing the backflow of pressurized gas. On the other hand, a large entrance portion 64 may facilitate the backflow of pressurized gas when molding with molding materials having a low viscosity. By way of a non-limiting example, a vent slot size of 0.001" by 0.100" may be used when molding with TPO or easy flowing polymers. While on the other hand, a vent slot size of 0.002" by 0.100" may be used when molding with ABS/LEXAN or filled polymers. Chamfered portion 62 accommodates the elevational differences between entrance portion 64 and each of the apertures 58 and, thus, completes the fluid path between entrance portion 64 and central bore 56. Moreover, it should be appreciated that a one or more vent slots may be used should a single aperture 58 be used.

Figure 5:
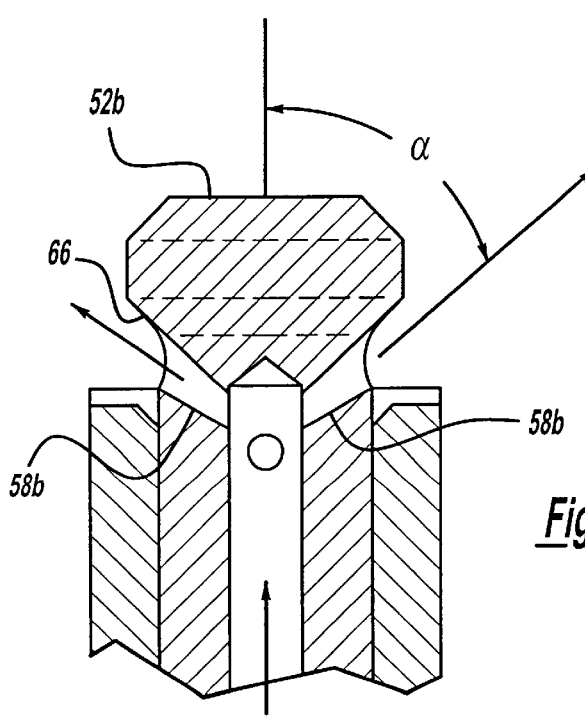
FIG. 5 is a cross-sectional view, similar to FIG. 3, showing the second preferred embodiment of the gas-assisted nozzle of the present invention.

Referring now to the second preferred embodiment shown in FIG. 5, it is anticipated that each of the plurality of apertures 58 may be directed at an acute angle (x relative to the longitudinal access of stem 46 (as indicated as 58b). By directing each of the plurality of apertures 58 at any angle other than normal to the .,access of stem 46 (as shown in FIG. 3), the spray of pressurized gas may be directed away from various features within mold cavity 24. As may be appreciated, in order to accommodate gas flow at angles other than 90 degrees relative to the stem axis, enlarged head 52 must be modified (as indicated as 52b). Specifically, enlarged head 52b includes a chamfered exterior portion 66 extending around a lower edge of enlarged head 52b. Chamfered exterior portion 66 is sized to prevent interference with the inclined gas flow. It should be appreciated that each of the plurality of apertures 58b may be directed at any angle relative to the axis of stem 44 that is conducive to providing a uniform wall thickness in the molded article.

In the operation of either preferred embodiment, cavity plate 20 and core 16 abut in the closed position and molten molding material is introduced into mold cavity 24 by molding material introduction device 32. At this time, ejector plate assembly 28 is retracted such that ejector pins 30 are flush with common plane 22. The distal end of gas injection valve assembly 36, and specifically enlarged head 52, project upwardly from common plane 22 into mold cavity 24.

Molten molding material is injected into mold cavity 24 in a known manmer at a typical pressure. Once the mold cavity is filled with a predetermined amount of molding material, pressurized gas is introduced into central bore 56. The pressure at which the gas is introduced is dependent upon numerous molding factor, not limited to the material being used, the size of the mold cavity, the temperatures used, etc. The force of the pressurized gas acts upon a piston 68 disposed at an end of stem 46 (FIG. 2). A spring 70 (FIG. 2) normally biases stem 46 and enlarged head 52 in a retracted position relative to hollow casing 44. Upon the introduction of pressurized gas within central bore 56, piston 68 is driven upwardly against the biasing force of spring 70, thereby extending stem 46 upward relative to hollow casing 44. The pressurized gas is thus injected into the interior of mold cavity 24 and voids the interior of the molten molding material from mold cavity 24. That is, the molten molding material is forced out of mold cavity 24 through vent valve 38. Consequently, a thin wall structure is left in mold cavity 24 to define the outer shape of the molded article.

In the event molding material has entered aperture 58, the introduction of pressurized gas into central bore 56 and aperture 58 is sufficient to clear any such obstruction.

Upon completion of the molding process, the introduction of pressurized gas into central bore 56 is terminated, which causes spring 70 to return stem 46 back into a retracted position. The pressurized gas remaining in mold cavity 24 may be released via the plurality of vent slots 60. Specifically, as enlarged head 52 retracts and abuts end face 54 of hollow casing 44, the plurality of vent slots 60 continue to define a fluid path (i.e. remain open) from mold cavity 24 to central bore 56 through entrance portion 64, chamfered portion 62, and aperture 58.

Once the pressure within mold cavity 24 is equalized relative to ambient conditions, cavity plate 20 is then opened, leaving the molded article on core 16. Ejector plate assembly 28 of ejector mechanism 26 is then advanced toward core 16 causing the ejector pins 30 to engage the molded article. At the same time, an ejector sleeve is advanced through core 16 to push the molded article from mold cavity 24. The molded article is then removed and cavity plate 20 is returned to a closed position ready to mold the next article. Ejector mechanism 26 also returns ejector plate assembly 28 to the retracted position, leaving gas injection valve assembly 36 protruding into mold cavity 24.

The injection needle of the present invention thereby enables the return flow of gas from the mold cavity through the vent slot to facilitate equalization of the gas pressure in the mold cavity relative to ambient condition even when the stem is in the retracted position. Furthermore, the vent slot of the injection needle is sized to minimize, eliminate, or at least deter backflow of molten molding material through the injection needle to minimize, eliminate, or at least deter any clogging effect. Still further, the injection needle of the present invention maximizes the structural integrity of the injection needle to provide an improved useful life.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A injection needle for use in a gas-assisted injection molding machine having a mold cavity, the injection needle comprising:

a hollow casing;

a stem sidably located in the hollow casing, the stem being positionable in a raised position and a retracted position, the stem having a central bore;

a plurality of apertures radially located in the stem, each of the plurality of apertures being connected to the central bore, the apertures being operable to supply gas into the mold cavity when the stem is in the raised position; and a plurality of vent slots disposed in the hollow casing, the vent slots being connected to the central bore and being operable to relieve gas pressure within the mold cavity when the stem is in the retracted position.

2. The injection needle according to claim 1 wherein each of the plurality of apertures is operable for supplying the gas in a direction substantially perpendicular to a longitudinal axis of the stem.

3. The injection needle according to claim 1 wherein each of the plurality of apertures is operable for supplying the gas at an acute angle relative to a longitudinal axis of the stem.

4. The injection needle according to claim 1 wherein a first of the plurality of apertures is radially disposed in the stem in a position substantially offset relative to a second of the plurality of apertures along a longitudinal axis of the stem.

5. The injection needle according to claim 1 wherein each of the plurality of vent slots is sized to operably prevent a backflow of molten molding material into the central bore when the stem is in the retracted position and simultaneously operable to relieve gas pressure within the mold cavity.

6. The injection needle according to claim 1 wherein each of the plurality of apertures defines a substantially conical cross section.

7. A gas-assisted injection molding machine needle disposed in a molding machine, said molding machine having a mold cavity, said molding machine needle comprising:
   a tubular member;
   a stem slidably located in the tubular member, the stem being positionable in a raised position and a retracted position and having a central bore;
   a first aperture located in the stem, the first aperture being connected to the central bore, the first aperture being operable for expelling gas when the stem is in the raised position; and
   a slot located in the tubular member, the slot being connected to the central bore, the slot being open when the stem is in the retracted position.

8. The needle according to claim 7 wherein the first aperture is operable for supplying the gas in a direction substantially perpendicular to a longitudinal axis of the stem.

9. The needle according to claim 7 wherein the first aperture is operable for supplying the gas at an acute angle relative to a longitudinal axis of the stem.

10. The needle according to claim 7, further comprising a second aperture located in the stem in a position substantially offset relative to the first aperture along a longitudinal axis of the stem.

11. The needle according to claim 7 wherein the slot is sized to operably prevent a backflow of molten molding material into the central bore when the stem is in the retracted position and simultaneously operable to relieve gas pressure within the mold cavity.

12. The needle according to claim 7 wherein the aperture defines a substantially conical cross section.

13. A gas injector for use in a gas-assisted injection molding machine, the gas-assisted injection molding machine defining a mold cavity, the gas injector comprising:
   a tubular member;
   a stem slidably located in the tubular member, the stem being positionable in a raised position and a retracted position;
   a central bore extending within the stem for supplying a gas;
   a pair of apertures located in the stem in fluid communication with the central bore, the pair of apertures being operable for supplying the gas into the mold cavity when the stem is in the raised position, a first of the pair of apertures is located in the stem in a position substantially offset relative to a second of the pair of apertures along a longitudinal axis of the stem; and
   a slot located in the tubular member, the slot being connected to the central bore, the slot being sized to operably deter a backflow of molten molding material into the central bore when the stem is in the retracted position while simultaneously operable to receive gas from the mold cavity.

14. The gas injector according to claim 13 wherein each of the pair of apertures is operable to supply the gas in a direction substantially perpendicular to a longitudinal axis of the stem.

15. The gas injector according to claim 13 wherein each of the pair of apertures is operable to supply the gas at an acute angle relative to a longitudinal axis of the stem.

16. The gas injector according to claim 13 wherein each of the pair of apertures defines a substantially conical cross section.

\* \* \* \* \*

UNITED STATES PATENT AND TRADEMARK OFFICE
CERTIFICATE OF CORRECTION

PATENT NO.    : 6,386,852 B1
DATED         : May 14, 2002
INVENTOR(S)   : Karl R. Berdan It is certified that error appears in the above-identified patent and that said Letters Patent is hereby corrected as shown below:

<u>Title page, Item [54] and Column 1, lines 1-2,</u>
Title, "GAS ASSIST NEEDLE IN A MOLDING MACHINE" should be -- GAS ASSIST NEEDLE --

<u>Column 5,</u>
Line 23, "(x" should be -- ∝ --
Line 26, after "the" delete ".,"

Signed and Sealed this

Twelfth Day of November, 2002

Attest:

JAMES E. ROGAN
*Attesting Officer*  *Director of the United States Patent and Trademark Office*